Patented Aug. 1, 1939

2,168,256

UNITED STATES PATENT OFFICE 2,168,256

PROCESS FOR DESULPHURIZATION OF ALKYL PHENOLS

Martin de Simó, Piedmont, and Aloysius Paul Brady, Oakland, Calif., assignors to Shell Development Company, San Francisco, Calif., a corporation of Delaware No Drawing. Application June 6, 1938, Serial No. 212,126

8 Claims. (Cl. 260—627)

This invention relates to the desulphurization of alkyl phenols by treating same preferably in the liquid phase at an elevated non-dehydrating temperature with certain finely divided heavy metals.

The term alkyl phenols as herein used refers to mixtures of acid-reacting hydroxy aromatic compounds consisting essentially of alkyl phenols and containing varying amounts of phenols and impurities such as organic sulphur and nitrogen compounds. Alkyl phenols, sometimes known as "acid oils", are obtained by extracting cracked mineral oil or coal tar distillates with aqueous solutions of alkali metal hydroxides and acidifying the alkaline extracts so obtained.

Alkyl phenols have a number of important applications. For instance, they are used in the flotation of ores; or in the manufacture of resins, cyclic alcohols, ketones, etc.; or as anti-oxidants, disinfectants, selective solvents, etc. The presence of certain impurities, particularly organic sulphur compounds, frequently lessens their usefulness in the various fields of application, and in processes such as the reduction of alkyl phenols to the corresponding alcohols with hydrogen over active hydrogenation catalysts such as nickel, even very small amounts of sulphur, e. g. of the order of .01% or less, may be definitely harmful.

It is the purpose of this invention to provide a method for desulphurization of alkyl phenols, whereby the sulphur content is lowered sufficiently so that it will not interfere with any of the above mentioned uses.

Methods heretofore employed for the desulphurization of alkyl phenols may be divided roughly into three classes, namely:

1. Those employing oxidation methods, whereby hydrosulphide sulphur compounds are oxidized to disulphides, which are then separated from the alkyl phenols by suitable means such as extracting with a solvent in the alkaline state, vacuum distillation in the acid state, etc.;

2. Those employing selective reduction methods involving an unexplained desulphurization mechanism; and 3. Those employing selective solvent extraction to separate thiophenols from phenols.

All of the above methods, though quite effective on certain alkyl phenol mixtures, possess the disadvantage of frequently being unsatisfactory with mixtures derived from other sources. Apparently the effectiveness of desulphurization depends to a large extent on the source and composition of the alkyl phenol mixtures, and the type of impurities contained therein. For example, of two alkyl phenols having sulphur contents above .5% one produced from West Texas and the other from California cracked distillates, the former could be desulphurized to well below .05% by air blowing in the alkaline state, whereas the latter yielded a minimum sulphur content of the order of .3% by the same method.

In our process we employ a principle which is different from those above mentioned. It is known that the largest portion of sulphur compounds contained in alkyl phenols are of the type of thiophenols. Both phenols and thiophenols tend to decompose when heated to elevated temperatures, phenols liberating water and thiophenols hydrogen sulphide, thereby forming neutral oils and tarry substances. Heretofore it was believed that the decomposition temperatures of both phenols and thiophenols were approximately the same, so that a separation by heating was not feasible.

Now we have discovered that in contact with large surfaces of certain metals, thiophenols can be decomposed in preference to phenols within a limited temperature range, and our invention comprises heating sulphur bearing phenols with one or several finely divided metals capable of preferentially decomposing thiophenols to a temperature between about 250° to 360° C. for a time sufficient to effect decomposition of thiophenols. Metals most suitable for this purpose are copper and the ferrous metals, i. e., iron, cobalt and nickel. Mixtures of these metals may be used. Their oxides, however, are not operative in our process, since in contact with them large amounts of alkyl phenols are converted to tarry substances. In this respect our desulphurization process differs radically from the desulphurization of hydrocarbons which are more effectively desulphurized with the oxides rather than the metals, unless desulphurization with metals is carried out under substantial hydrogen pressure. However, the presence of substantial amounts of free hydrogen which is beneficial for desulphurizing hydrocarbons in the presence of metals is neither required nor desirable in our process. It raises the expense of our treatment unnecessarily and may even be harmful, because considerable portions of the phenols may be and frequently are converted to neutral oils.

Since the oxides of the metals, which are capable of preferentially decomposing thiophenols, are harmful to the phenols, the metals used in the desulphurization of phenols should be substantially free of oxides and metal compounds such as the carbonates which under the conditions of the process may be converted to the oxides. If desired, the metals may be subjected to a reducing treatment immediately before use in our process to reduce oxides which they may contain. Even small amounts of oxides tend to interfere with the desulphurization, causing not only loss of phenols but also relatively poor desulphurization until they are reduced by the phenols themselves. Moreover the metals should be in finely divided form to provide as large a contact surface as possible. So called cement copper consisting predominantly of finely divided metallic copper is a convenient commercially available material suitable for our process.

Temperatures most suitable for our treatment are between about 250° to 360° C. as stated before, and preferably between 300° and 330° C. At temperatures below 250° C. desulphurization is incomplete and too slow to be practical. At 330° C. dehydration of phenols begins and at 360° C. the rate of dehydration is appreciable. Upon heating an alkyl phenol mixture in the presence of copper for 4 hours to 400° C., a treated mixture containing 3½% neutral oil was obtained. Between 300° and 330° C. desulphurization normally proceeds smoothly and at practical rates. In the course of the desulphurization the metal is converted to the sulphide.

The time required for effectively desulphurizing is preferably at least about ½ hour and normally between about 1 to 5 hours when operating by the batch method. In continuous operation the time of contact may be extended to about 6 hours. Contact times greatly in excess of these limits are usually of little additional benefit and may result in material loss of phenols if the temperature is substantially above 330° C. Periods of contact less than ½ hour such as 5 to 10 minutes may result in a relatively small degree of desulphurization.

Because of the extended time of contact required, we prefer to carry out our treatment in the liquid state. Vapor phase treatment is impractical since enormously large equipment would be required to treat relatively small quantities of the phenols.

The amounts of metal reagent which we add to the alkyl phenols in order properly to desulphurize are not less than about 15% and preferably not less than 25% in excess of the stoichiometric quantity equivalent to the sulphur to be removed from the alkyl phenols to form cupric, ferric, etc., sulphides. Smaller quantities of the metal reagents tend to result in poor desulphurization. Normally we mix with a batch of alkyl phenols an amount of metal reagent many times the stoichiometric quantity necessary to form the higher sulphides. After completed desulphurization the reagent is separated from the treated alkyl phenols and is used to desulphurize another batch of alkyl phenols. In this manner we may use a charge of metal reagent until about 75 to 85% thereof has been converted to the higher sulphide.

Instead of treating the alkyl phenols batchwise we may pass them continuously through a contact vessel maintained at a proper desulphurization temperature at such a rate, that the residence time of the alkyl phenols in the vessel is between about 2 to 6 hours. In the reaction vessel the alkyl phenols are contacted with an excess of the metal reagent as described. The continuously outgoing stream of treated alkyl phenols contains suspended metal reagent which is separated from the liquid in any suitable manner such as filtering in a streamlined filter, settling, centrifuging in a basket centrifuge, etc. The reagent so recovered, if less than 75 to 85% converted to the higher sulphide may be returned to the reaction vessel until at least 75% spent.

Inasmuch as during the desulphurization metal is converted to the sulphide, it is necessary eventually to discard the spent reagent. If desired it may be regenerated, as by roasting and reducing. Since the cost of the reagent or its recovery forms the major part of the cost of our treatment, we usually precede our treatment by another less expensive desulphurization method such as air blowing or selective extraction of thiophenols. The partly desulphurized alkyl phenols are then subjected to our treatment as described.

The desulphurizing treatment with metal reagent may be followed by an additional treatment further to reduce the sulphur content, in cases where it is desired to hydrogenate the alkyl phenols over nickel catalyst, in order to prevent poisoning of the latter. One method of further reducing the sulphur content of the metal treated alkyl phenols comprises fractionally distilling the same under vacuum to avoid cracking and to remove small top and bottom fractions of about 3 to 15% each. A middle fraction is thereby recovered which normally has a sulphur content of about one-fifth to one-tenth of the undistilled alkyl phenols.

Another method of further reducing the sulphur content which is often useful, comprises contacting the sulphur bearing alkyl phenols in succession with two or more different metals capable of effecting desulphurization as described. For instance, alkyl phenols which have been desulphurized with copper to a point so that additional treatment with more copper fails to reduce the sulphur content to still lower levels can often further be desulphurized by treating them for instance with nickel under similar conditions.

The following examples serve to illustrate our process:

Example 1

48 liters of alkyl phenols containing about .1 to .2% sulphur were treated in 24 successive 2-liter batches with a single charge of 150 gm. copper powder at temperatures between 300° to 345° C. The average sulphur content of the first 20 runs was .020%, the sulphur content of the individual batches of treated alkyl phenols fluctuating between the extremes of .012 to .030%, except for the very first run in which the sulphur content was .035%, the poor result being due to the presence of a small amount of oxide in the powder. At the end of the 20th batch enough sulphur had been absorbed by the copper metal to convert about 75% thereof to the cupric sulphide. In the 21st batch the sulphur content of the alkyl phenols after treatment was .050%, and in the subsequent 3 batches above .060%. The time of contact during the first 17 batches was three hours each, and four hours for the following 7 batches.

A sample of the copper treated alkyl phenols having a sulphur content of .029% was then fractionally distilled at atmospheric pressure. The sulphur distribution in the several fractions was as follows:

| Fraction No. | Percent of still charge | Percent sulphur |
|---|---|---|
| 1 | 3½ | .300 |
| 2 | 3½ | .017 |
| 3 | 3½ | .012 |
| 4 | 10 | .008 |
| 5 | 30 | .005 |
| 6 | 30 | .006 |
| 7 | 10 | .010 |
| 8 | 3½ | .017 |
| Bottoms | 6⅔ | .190 |

The middle fractions from 2 to 8, when blended, formed a product with less than .01% sulphur. The resulting blend amounted to 90% of the total charge.

Example II 50 parts by weight of alkyl phenols containing 0.2% sulphur were treated with 1 part by weight of iron powder at a temperature of 300° C. for 4 hours. In the course of the treatment the sulphur content of the alkyl phenols was reduced as follows:

| Duration of treatment | 1 hour | 2½ hours | 4 hours |
|---|---|---|---|
| Percent sulphur in alkyl phenols | .032 | .025 | .022 |

Example III

Alkyl phenols containing .2% sulphur were passed continuously through a 4 liter reaction vessel maintained at a temperature of 300° C. In the vessel the alkyl phenols were stirred with commercial cement copper and the outflowing stream of alkyl phenols was filtered continuously. The rate of flow was such as to maintain an average residence time in the vessel of two and four hours, respectively. The sulphur content of treated alkyl phenols was as follows:

| | Residence time | |
|---|---|---|
| | 2 hours | 4 hours |
| Average sulphur content—percent | .038 | .023 |

Example IV 7 batches of 2000 ml of each of a copper treated alkyl phenol mixture containing .021% sulphur were treated in succession with a single charge of a finely divided nickel. Conditions and results were as follows:

| Batch No. | Temp. °C. | Time of contact, hours | Percent S in product |
|---|---|---|---|
| 1 | 300 | 3 | .004 |
| 2 | 300 | 3 | .005 |
| 3 | 300 | 3 | .004 |
| 4 | 305 | 3 | .007 |
| 5 | 300 | 3 | .007 |
| 6 | 325 | 3 | .005 |
| 7 | 320 | 3 | .006 |

We claim as our invention:

1. In a process for desulphurizing alkyl phenols containing organic sulphur compounds, the steps of contacting said alkyl phenols in the liquid state at a non-dehydrating temperature above 250° C. for a time sufficient to desulphurize with a reagent comprising a finely divided metal selected from the group consisting of copper, iron, cobalt and nickel in an amount at least 15% in excess of that required to convert sulphur removable from the alkyl phenols by conversion to the higher sulphide of said metal.

2. The process of claim 1 in which the temperature is between 250° to 360° C.

3. The process of claim 1 in which the time of contact is between two to five hours.

4. The process of claim 1 in which the reagent is cement copper.

5. In a process for desulphurizing alkyl phenols containing organic sulphur compounds, the steps of contacting said alkyl phenols in the liquid state at a non-dehydrating temperature above 250° C. for at least one-half hour in the absence of added hydrogen with a reagent comprising a finely divided metal selected from the group consisting of copper, iron, cobalt and nickel in an amount at least 15% in excess of that required to convert sulphur removable from the alkyl phenols by conversion to the higher sulphide of said metal.

6. In a process for desulphurizing alkyl phenols containing organic sulphur compounds, the steps of contacting said alkyl phenols in the liquid state at a non-dehydrating temperature above 250° C. for at least one-half hour with a reagent comprising a finely divided metal selected from the group consisting of copper, iron, cobalt and nickel in an amount at least 15% in excess of that required to convert sulphur compounds removable from the alkyl phenols by conversion to the higher sulphide of said metal, separating the reagent from the contacted alkyl phenols, and fractionally distilling the latter under non-cracking conditions to remove at least one of the terminal fractions to the extent of from 3 to 15% of the total quantity of alkyl phenols and to produce a remaining fraction having a lower sulphur content than the contacted undistilled alkyl phenol fraction.

7. In a process for continuously desulphurizing alkyl phenols containing organic sulphur compounds, the steps of flowing said alkyl phenols in the liquid state through a reaction zone maintained at a non-dehydrating temperature above 250° C. at a rate of flow to provide an average residence time in said zone between two to six hours, contacting said alkyl phenols while residing in said zone with a reagent comprising a finely divided metal selected from the group consisting of copper, iron, cobalt and nickel in an amount at least 15% in excess of that required to convert sulphur removable by the treatment from the alkyl phenols residing in said zone to the higher sulphide of said metal, withdrawing from said zone treated alkyl phenols containing suspended reagent, and separating the reagent from the withdrawn alkyl phenols.

8. In a process for semi-continuously desulphurizing alkyl phenols containing organic sulphur compounds, the steps of flowing said alkyl phenols in the liquid state through a reaction zone maintained at a non-dehydrating temperature above 250° C. at a rate of flow to provide an average residence time in said zone between two to six hours, contacting said alkyl phenols while residing in said zone with a reagent comprising a finely divided metal selected from the group consisting of copper, iron, cobalt and nickel in an amount several times that required to convert sulphur removable by the treatment from the alkyl phenols residing in said zone to the higher sulphide of said metal, withdrawing treated alkyl phenols containing suspended reagent from said zone, separating said reagent from the withdrawn alkyl phenols and returning the separated reagent to the vessel until an amount of sulphur has been absorbed by said reagent sufficient to convert about 75 to 85% of the metal originally contained therein to its higher sulphide.

MARTIN DE SIMO.
ALOYSIUS PAUL BRADY.